United States Patent
Longo

[11] Patent Number: 5,888,281
[45] Date of Patent: Mar. 30, 1999

[54] CORROSION INHIBITING COMPOSITION

[75] Inventor: Matthew W. Longo, LaGrange, Ill.

[73] Assignee: Daubert Chemical Company, Inc., Chicago, Ill.

[21] Appl. No.: 916,348

[22] Filed: Aug. 22, 1997

[51] Int. Cl.$^6$ .............................. C09K 15/12; C09D 5/08
[52] U.S. Cl. .................................. 106/14.21; 106/14.34; 106/14.35; 106/14.38; 106/14.41; 106/14.43; 106/271; 106/272
[58] Field of Search .............................. 106/14.29, 14.34, 106/14.35, 14.38, 14.41, 14.43, 271, 272

[56] References Cited

U.S. PATENT DOCUMENTS

| | | | |
|---|---|---|---|
| 3,080,330 | 3/1963 | Rudel et al. | 106/14.29 |
| 3,746,643 | 7/1973 | Rogers | 106/14.29 |
| 3,754,942 | 8/1973 | Moradian | 106/14.29 |
| 3,925,087 | 12/1975 | Lechner et al. | 106/14.25 |
| 4,495,225 | 1/1985 | Ciuba et al. | 106/14.25 |
| 4,631,083 | 12/1986 | Christhilf et al. | 106/14.25 |
| 4,675,215 | 6/1987 | Ciuba et al. | 1069/14.29 |
| 4,718,942 | 1/1988 | Laura et al. | 106/14.29 |
| 4,729,791 | 3/1988 | Laura et al. | 106/14.36 |
| 4,749,412 | 6/1988 | Ciuba et al. | 106/14.25 |
| 4,842,903 | 6/1989 | Hayner | 106/14.29 |
| 4,946,503 | 8/1990 | Hattori et al. | 106/14.36 |
| 5,338,346 | 8/1994 | Luttinger et al. | 106/14.29 |
| 5,354,372 | 10/1994 | Ebayashi et al. | 106/14.29 |

FOREIGN PATENT DOCUMENTS

| | | | |
|---|---|---|---|
| 59-147061 | 8/1984 | Japan | 106/14.36 |
| 2179363 | 3/1987 | United Kingdom | 106/14.29 |

*Primary Examiner*—Anthony Green
*Attorney, Agent, or Firm*—Wallenstein & Wagner, Ltd.

[57] ABSTRACT

A corrosion inhibiting composition, comprising 20%–65% (wt.) of a wax; 10.0%–31.0% (wt.) of an oil; and 4.0%–16.0% (wt.) of a active calcium sulfonate. The wax of the corrosion inhibiting composition is preferably a microcrystalline wax, and may be at least partially obtained from petrolatum. Up to 6.0% polypropylene may also be used, either alone or in combination with up to 6.0% polyethylene. The corrosion inhibiting composition may also include SEBS rubber, in an amount of 2.0% to 6.0%.

3 Claims, No Drawings

CORROSION INHIBITING COMPOSITION

DESCRIPTION

TECHNICAL FIELD

The invention relates to an improved corrosion inhibiting coating, and more particularly to a hot melt, corrosion inhibiting coating with superior adhesion, coating uniformity and high temperature handleability and stability for use in coating chassis components and other heavy metal parts of automobiles and other vehicles.

BACKGROUND OF THE INVENTION

Corrosion inhibiting compositions for use with heavy metal parts of automobiles and other vehicles are known in the art. An example of such a composition s described in U.S. Pat. No. 5,455,075, which is assigned to the assignee of the present invention. This composition is comprised of a number of components, particularly a plasticizer, a thixotropic overbased alkaline earth metal organic sulfonate complex with an alkaline earth metal carbonate, a Newtonian alkaline earth metal organic sulfonate, an antioxidant, a thermoplastic elastomer, a microcrystalline wax, and a polyethylene.

This composition was generally useful for its intended purpose. However, certain improvements in this composition were deemed to be desirable.

SUMMARY OF THE INVENTION

The present invention is a corrosion inhibiting composition, comprising: 20%–65% of a wax; 10.0%–31.0% of an oil; and 4.0%–16.0% of a active calcium sulfonate.

In another aspect of the invention, the wax of the corrosion inhibiting composition is a microcrystalline wax.

In yet another aspect of the invention, the wax of the corrosion inhibiting composition is at least partially obtained from petrolatum.

A still further aspect of the invention is a corrosion inhibiting composition includes up to 6.0% polypropylene, either alone or in combination with up to 6.0% polyethylene.

Yet another aspect of the invention is a corrosion inhibiting composition that includes SEBS rubber, particularly in an amount of 2.0% to 6.0%.

The present invention is superior in its low temperature adhesion. Particularly, tests have shown that the present composition remains adhered to the components that it coats at low temperatures, under stress, even with generally heavy coating thicknesses.

DETAILED DESCRIPTION OF THE PREFERRED EMBODIMENT

The present invention is a corrosion inhibiting composition, comprising: 20%–65% of a wax; 10.0%–31.0% of an oil; and 4.0%–16.0% of a active calcium sulfonate.

Some oil must be used in the present composition. The oil may be obtained by the addition of a conventional oil to the composition. Alternatively, the oil for this invention may be obtained from a dispersion which includes oil, but which is being primarily added to the composition for other of its ingredients. For example, in the below described embodiments, oil may be provided instead by the SACI RP-230 HF, which is used primarily as the source of the thixotropic calcium sulfonate.

This invention uses thixotropic calcium sulfonates because of its well-known rust inhibiting capabilities. Its thixotropic characteristics are the key to uniformity of coating the present composition onto car frames and the like. Unlike Newtonian materials, thixotropic materials do not have a tendency to flow towards and collect at the bottom of a part.

Prior compositions controlled application viscosity through a blend of thixotropic and Newtonian sulfonates. However, it has now been discovered that other Newtonian materials such as oil will also control application viscosity. The amount of sulfonate used depends upon the extent of corrosion protection desired.

An antioxidant may be used to increase pot life. However, if the corrosion inhibiting composition is used rapidly by the end user, no antioxidant is necessary.

A thermoplastic elastomer enhances the firmness of the coating and its heat resistance. A combination of a thermoplastic elastomer, polypropylene, and polyethylene is believed to give the highest heat resistance.

The wax used in this invention is of the highest melting type, as a relatively inexpensive way of enhancing heat resistance. In this embodiment, petrolatum has been added as a flexible wax to improve adhesion. Though sold under the tradename "petrolatum", this material could also be considered to be a microcrystalline wax by those skilled in the art.

Polyethylene and polypropylene are used to increase heat resistance, and the present invention uses the highest melting point polyethylene believed to be available to the general market. As heat resistance increases, application temperature also increases.

A long chain alcohol imparts some water resistance to the formulation.

Carbon black is added as a pigment. Although a clear composition is as effective as a pigmented composition, the clear composition is susceptible to lowered performance upon exposure to UV rays.

The present formulations are blended to a specific viscosity range, so as to provide a particular film build. This invention is designed to provide a viscosity of 100–400 centipoise at application temperatures. At this viscosity, the typical film thickness ranges from 3–7 mils.

"Active calcium sulfonate" means the actual amount of calcium sulfonate in a calcium sulfonate solution or dispersion. For example, if the corrosion-inhibiting composition contains 10% by weight of a calcium sulfonate-containing dispersion, and that dispersion is 40% active (i.e., it contains 40% calcium sulfonate), then, for the purposes of the claims, the amount of active calcium sulfonate in the composition is 4.0% active calcium sulfonate.

In another aspect of the invention, the wax of the corrosion inhibiting composition is a microcrystalline wax.

In yet another aspect of the invention, the wax of the corrosion inhibiting composition is at least partially obtained from petrolatum.

A still further aspect of the invention is a corrosion inhibiting composition includes up to 6.0% polypropylene, either alone or in combination with up to 6.0% polyethylene.

Yet another aspect of the invention is a corrosion inhibiting composition that includes SEBS rubber, particularly in an amount of 2.0% to 6.0%.

Various sources provide the components that are used in the composition of the invention. The "oil", as that term is used in this specification and claims, is at least partially provided by a paraffinic oil sold as Citgo 340 Neutral, available from Citgo Petroleum Company, P.O. Box 3758, Tulsa, Okla. 74102. This product is a solvent refined heavy paraffinic distillate. The product has a Commodity Code of 27-030, and a CAS No. of 64741-88-4.

Kraton G-1652 thermoplastic rubber is the "SEBS rubber" of the present specification and claims. This thermoplastic rubber is a styrene-ethylene-butylene-styrene block copolymer. It is available from the Shell Chemical Company, 2001 Kirby Drive, Houston, Tex. 77019.

The "active calcium sulfonate", as that term is used in the present specification and claims, is provided by Witco Corporation, 520 Madison Avenue, New York, N.Y. 10022, in a product known as SACI RP-230 HF. The product is a colloidal dispersion in mineral oil of a thixotropic overbased calcium organic sulfonate complexed with calcium carbonate. The composition comprises 75% (wt.) 2000 SUS napthenic oil, 12.5% (wt.) calcium carbonate, and 12.5% (wt). calcium sulfonate. Its viscosity ranges from 40,000 to 60,000 centipoise (cps) at 25 degrees C., and it has a typical viscosity of 50,000 cps at that temperature. For the purposes of this invention, this product is 12.5% active calcium sulfonate.

Polyethylene is provided by Petrolite Specialty Polymers Group, 6910 East 14th Street, Tulsa, Okla. 74112. The polyethylene is sold under the name Polywax 3000 Polyethylene, and is a normal paraffin having an average molecular weight of approximately 3000. This ethene homopolymer has a CAS Number of 9002-88-4.

EPAL 20+ alcohol is a blend of linear and branched alcohols. In particular, it is a fatty alcohol/paraffin mixture, with a CAS No. of 68911-61-5. It is sold by Ethyl Corporation, Industrial Chemicals Division, Ethyl Tower, 451 Florida Boulevard, Baton Rouge, La. 70801.

A carbon black for the composition is provided by Cabot Corporation, Special Blacks Division, 950 Winter St., P.O. Box 9073, Waltham, Mass. 02254. It is sold under the name "Monarch 120."

Polypropylene is provided by the Eastman Chemical Company, Texas Eastman Division, P.O. Box 7444, Longview, Tex. 75607-7444. This polypropylene is sold under the trademark Epolene N-15 wax. Its Product Identification No. is PLS N-15.

Another wax is sold under the name Citgo HI-618 wax by the Citgo Petroleum Corporation, P.O. Box 3758, Tulsa, Okla. 74102. This wax is a paraffin wax, and is the "microcrystalline wax", as that term is used in both the specification and the claims. It has a commodity code 52-004, and a CAS No. of 64742-61-6.

A highly overbased calcium sulfonate is provided under the tradename "Hybase LE C-400" by Surpass Chemicals Limited, Sonneborn Division of Witco Corporation, Suite 100, 250 Consumer Road, Willowdale, Ontario M2J 4V6.

Crude petrolatum is manufactured by Exxon Chemical as Exxon 3655, and is distributed as Paxwax 6681 by National Wax Company, 3850 Touhy Avenue, PO Box 549, Skokie, Ill. 60067.

Finally, an antioxidant and thermal stabilizer is used, and it is sold under the tradename "IRGANOX 1010". This product has a CAS No. of 6683-19-8, and it is sold by Ciba-Geigy Corporation, Additives Division, Seven Skyline Drive, Hawthorne, N.Y. 10532.

Examples of products in accordance with the claimed invention are the following. A composition that is described as being suitable for high temperature applications is one which will not drip off of parts at test temperatures of up to 280 degrees Fahrenheit. A composition that is described as being suitable for low temperature applications is one which will not drip off of parts at test temperatures of up to 212 degrees Fahrenheit. A composition that is described as being suitable for standard applications is one which will not drip off of parts at test temperatures of up to 240 degrees Fahrenheit.

EXAMPLE 1

This Example is a most preferred embodiment of the invention, especially for high temperature applications. Because of the high polypropylene content, this composition has superior heat resistance. In this Example, the following ingredients are blended at room temperature into a mixer, with the mixer running during the addition of the ingredients, and in the following order: 30.9 grams of Citgo 340 Neutral oil; 4.8 grams of Kraton G-1652 rubber; 18 grams of SACI RP-230-HF; 4.1 grams of Polywax C-3000; 4.8 grams of EPAL 20+; 2.5 grams of Monarch 120 carbon black, as a pigment; and 3.9 grams of EPOLENE N-15 polypropylene. After the addition of the polypropylene, the blend is heated to 300 degrees F. After the blend attains 300 degrees F., it is retained at that temperature for 30 minutes.

After 30 minutes, and with the blender continuing to run, the following ingredients are added, in the following order: 20.8 grams Citgo HI-618 wax, as the microcrystalline wax; 10.0 grams Paxwax 6681 petrolatum.

When all of these ingredients have been added, the temperature of the blend is raised to 320 degrees F. After the temperature reaches 320 degrees F., the blend is mixed for an additional 30 minutes.

EXAMPLE 2

This Example is another embodiment for low temperature applications. Because it is not intended for high temperature applications, it is unnecessary to use polypropylene.

In this Example, the following ingredients are blended at room temperature into a mixer, with the mixer running during the addition of the ingredients, and in the following order: 23.775 grams of Citgo 340 Neutral oil; 4.1 grams of Kraton G-1652 rubber; 16 grams of SACI RP-230-HF; 2.2 grams of Polywax C-3000 polyethylene; 4.0 grams of EPAL 20+; and 2.5 grams of Monarch 120 carbon black, as a pigment. After the addition of the pigment, the blend is heated to 300 degrees F. After the blend attains 300 degrees F., it is retained at that temperature for 30 minutes.

After 30 minutes, and with the blender continuing to run, the following ingredients are added, in the following order: 26.35 grams Citgo HI-618 wax, as the microcrystalline wax; 19.0 grams Paxwax 6681 petrolatum, which is also a source of wax; and 2.0 grams Witco Hybase C-400 (40% active), as the Newtonian calcium sulfonate.

When all of these ingredients have been added, the temperature of the blend is raised to 320 degrees F. After the temperature reaches 320 degrees F., the blend is mixed for an additional 30 minutes.

EXAMPLE 3

This Example is another embodiment, but for standard conditions, i.e., neither high nor low temperature conditions.

In this Example, the following ingredients are blended at room temperature into a mixer, with the mixer running during the addition of the ingredients, and in the following order: 24.5 grams of Citgo 340 Neutral oil; 4.8 grams of Kraton G-1652 rubber; 22 grams of SACI RP-230-HF; 4.0 grams of Polywax C-3000 polyethylene; 4.8 grams of EPAL 20+; and 2.6 grams of Monarch 120 carbon black, as a pigment. After the addition of the pigment, the blend is heated to 300 degrees F. After the blend attains 300 degrees F., it is retained at that temperature for 30 minutes.

After 30 minutes, and with the blender continuing to run, the following ingredients are added, in the following order: 24.5 grams Citgo HI-618 wax, as the microcrystalline wax; 10.0 grams Paxwax 6681 petrolatum, which is also a source of wax; and 2.0 grams Witco Hybase C-400 (40% active), as the Newtonian calcium sulfonate.

When all of these ingredients have been added, the temperature of the blend is raised to 320 degrees F. After the temperature reaches 320 degrees F., the blend is mixed for an additional 30 minutes.

EXAMPLE 4

Another highly preferred embodiment in accordance with the invention has so-called high temperature flow grade characteristics. This embodiment is made as follows.

In this Example, the following ingredients are blended at room temperature into a mixer, with the mixer running during the addition of the ingredients, and in the following order: 30.0 grams of Citgo 340 Neutral oil; 4.8 grams of Kraton G-1652 rubber; 18.0 grams of SACI RP-230-HF; 4.1 grams of Polywax C-3000 polyethylene; 4.8 grams of EPAL 20+; 2.5 grams of Monarch 120 carbon black, as a pigment; and 3.7 grams of EPOLENE N-15 polypropylene. After the addition of the polypropylene, the blend is heated to 300 degrees F. After the blend attains 300 degrees F., it is retained at that temperature for 30 minutes.

After 30 minutes, and with the blender continuing to run, the following ingredients are added, in the following order: 19.7 grams Citgo HI-618 wax, as the microcrystalline wax; 10.0 grams Paxwax 6681 petrolatum, which is also a source of wax; 2.0 grams Witco Hybase C-400 (40% active), as the Newtonian calcium sulfonate; and 0.2 grams Irganox 1010, as an antioxidant.

When all of these ingredients have been added, the temperature of the blend is raised to 320 degrees F. After the temperature reaches 320 degrees F., the blend is mixed for an additional 30 minutes.

EXAMPLE 5

Another embodiment in accordance with the invention is made as follows. This embodiment is highly similar to the embodiment of Example 4. However, the Citgo 340 Neutral oil is eliminated, and replaced by an equal amount of additional Citgo HI-618 wax.

In this Example, the following ingredients are blended at room temperature into a mixer, with the mixer running during the addition of the ingredients, and in the following order: 0.0 grams of Citgo 340 Neutral oil (oil is provided instead by the SACI RP-230 HF); 4.8 grams of Kraton G-1652 rubber; 18.0 grams of SACI RP-230-HF; 4.1 grams of Polywax C-3000 polyethylene; 4.8 grams of EPAL 20+; 2.5 grams of Monarch 120 carbon black, as a pigment; and 3.9 grams of EPOLENE N-15 polypropylene. After the addition of the polypropylene, the blend is heated to 300 degrees F. After the blend attains 300 degrees F., it is retained at that temperature for 30 minutes.

After 30 minutes, and with the blender continuing to run, the following ingredients are added, in the following order: 49.7 grams Citgo HI-618 wax, as the microcrystalline wax; 10.0 grams Paxwax 6681 petrolatum, which is also a source of wax; 2.0 grams Witco Hybase C-400 (40% active), as the Newtonian calcium sulfonate; and 0.2 grams Irganox 1010, as an antioxidant.

When all of these ingredients have been added, the temperature of the blend is raised to 320 degrees F. After the temperature reaches 320 degrees F., the blend is mixed for an additional 30 minutes.

The present compositions are superior in their ability to remain adhered at low temperatures. Particularly, tests have shown that the present composition remains adhered to the components that it coats at low temperatures, under stress, even with generally heavy coating thicknesses.

What we claim is:

1. A corrosion inhibiting composition, comprising:

(a) 20%–65% of a microcrystalline wax and petrolatum;

(b) 10.0%–31.0% of a paraffinic oil;

(c) 4.0%–16.0% of a active calcium sulfonate; and (d) styrene ethylene-butylene-styrene rubber in an amount of 2.0% to 6.0%.

2. The corrosion inhibiting composition of claim 1, further comprising up to 6.0% polypropylene.

3. The corrosion inhibiting composition of claims 1 or 2, further comprising up to 6.0% polyethylene.

* * * * *

UNITED STATES PATENT AND TRADEMARK OFFICE
CERTIFICATE OF CORRECTION

PATENT NO.    : 5,888,281
DATED         : March 30, 1999
INVENTOR(S)   : Matthew W. Longo It is certified that error appears in the above-identified patent and that said Letters Patent is hereby corrected as shown below:

In clause (c) of Claim 1, at column 6, line 41 of the patent, please insert after the words "calcium sulfonate", the words -- complexed with calcium carbonate --

Signed and Sealed this

Fifteenth Day of May, 2001

*Attest:*

NICHOLAS P. GODICI

*Attesting Officer*      *Acting Director of the United States Patent and Trademark Office*